(12) United States Patent
Glueck

(10) Patent No.: US 7,950,857 B2
(45) Date of Patent: May 31, 2011

(54) ROLLING BEARING WITH HEATING ELEMENT

(75) Inventor: Stefan Glueck, Schweinfurt (DE)

(73) Assignee: Schaeffler KG, Herzogenaurach (DE)

( * ) Notice: Subject to any disclaimer, the term of this patent is extended or adjusted under 35 U.S.C. 154(b) by 412 days.

(21) Appl. No.: 12/095,355

(22) PCT Filed: Dec. 5, 2006

(86) PCT No.: PCT/DE2006/002151
§ 371 (c)(1),
(2), (4) Date: May 29, 2008

(87) PCT Pub. No.: WO2007/065412
PCT Pub. Date: Jun. 14, 2007

(65) Prior Publication Data
US 2008/0298733 A1    Dec. 4, 2008

(30) Foreign Application Priority Data

Dec. 6, 2005   (DE) .......................... 10 2005 058 141

(51) Int. Cl.
*F16C 32/00*   (2006.01)

(52) U.S. Cl. ...................................... 384/476; 384/900

(58) Field of Classification Search .................. 384/476, 384/510, 559, 900
See application file for complete search history.

(56) References Cited

U.S. PATENT DOCUMENTS

| | | | | | |
|---|---|---|---|---|---|
| 2,451,124 | A | * | 10/1948 | Smith | 384/476 |
| 2,504,284 | A | * | 4/1950 | Voigt | 384/476 |
| 3,097,027 | A | * | 7/1963 | Mims et al. | 384/476 |
| 3,924,825 | A | * | 12/1975 | Peschke | 384/313 |
| 5,592,882 | A | * | 1/1997 | Toyoda | 101/487 |
| 2006/0191496 | A1 | * | 8/2006 | Muenzner et al. | 122/13.01 |

FOREIGN PATENT DOCUMENTS

| | | |
|---|---|---|
| DE | 20001339 | 4/2000 |
| FR | 2 474 267 A | 7/1981 |
| JP | 03014912 A * | 1/1991 |

* cited by examiner

*Primary Examiner* — Thomas R Hannon
(74) *Attorney, Agent, or Firm* — Lucas & Mercanti, LLP

(57) ABSTRACT

A rolling bearing which has at least one heated rolling bearing ring. An electrical heating element is applied with good thermally-conductive contact to a surface section of the heated rolling bearing ring. The heat quantity which can be generated by the heating element is dimensioned such that the heated rolling bearing ring undergoes thermal expansion when heated, which permits the rolling bearing to be mounted on a frame element with the formation of a shrink fit during subsequent cooling.

5 Claims, 1 Drawing Sheet

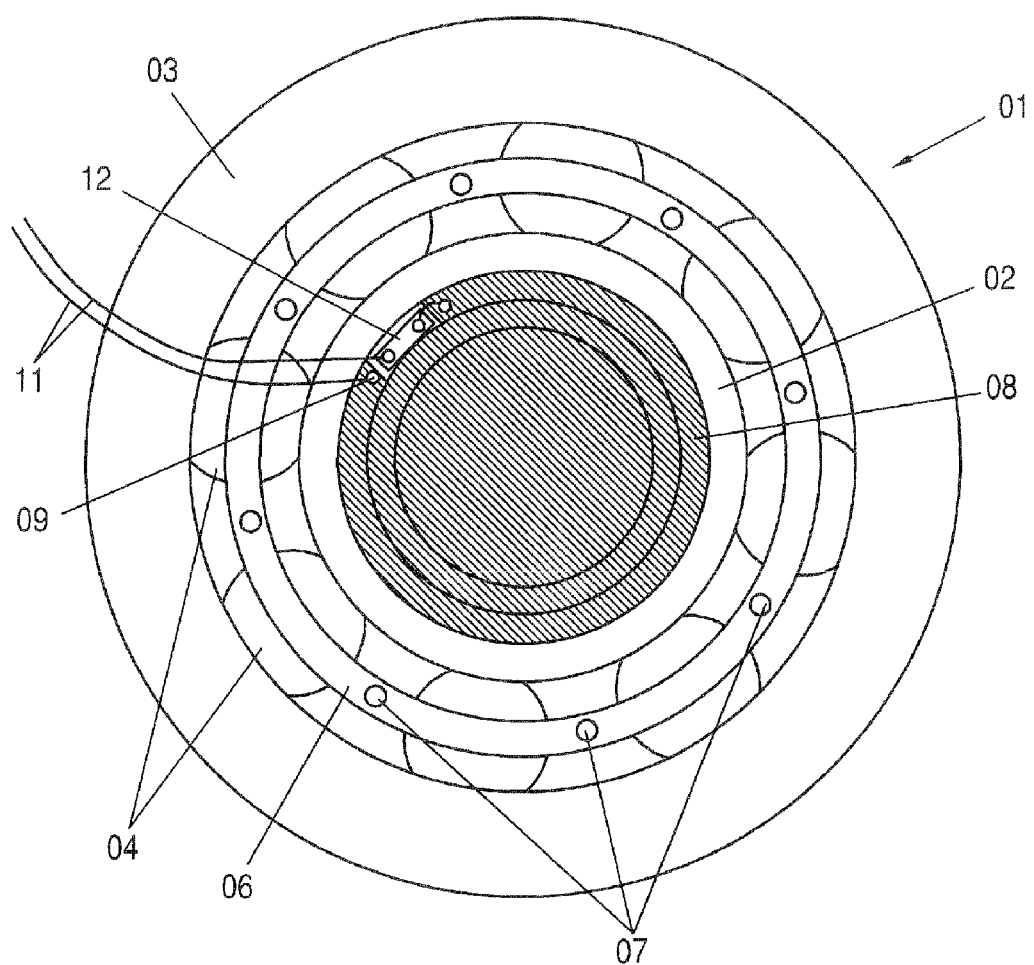

ROLLING BEARING WITH HEATING ELEMENT

FIELD OF THE INVENTION

The invention relates to rolling bearings which are assembled onto a shaft or onto a similar frame element by means of shrinkage. The invention also relates to rolling bearings which, for low-wear and precise operation, require an increased operating temperature which is not yet available during the start-up phase. The invention also relates to a method for assembling a rolling bearing.

BACKGROUND OF THE INVENTION

The shrinkage method is often used for the assembly of rolling bearings. For example, if a rolling bearing is to be assembled on a shaft, then said rolling bearing is firstly heated. On account of thermal expansion, said rolling bearing then has a slightly larger inner diameter. In contrast, the shaft remains at room temperature or is possibly cooled in order to then have a smaller outer diameter. The shaft and the rolling bearing are dimensioned such that the rolling bearing can be pushed onto the shaft only as a result of the slight inner diameter enlargement. After the rolling bearing is pushed on, it cools and the inner diameter decreases in size. The rolling bearing and shaft are now connected to one another in a frictionally engaging manner; this is also referred to as a shrink fit. If heating occurs during operation, the rolling bearing and the shaft will be heated at the same time on account of their spatial proximity and the heat conduction between them. If the coefficients of thermal expansion are equal or similar, then the rolling bearing and the shaft will also expand to approximately the same extent, such that the frictionally engaging connection is maintained. A connection of said type has the advantages that it can absorb very high forces and that no further connecting parts are required.

The heating of the rolling bearing takes place conventionally by means of heating plates, welding torches, furnaces, inductive heating devices and the like. The temperature of the rolling bearing must, after heating, be sufficiently high that the resulting enlargement of the inner diameter allows said rolling bearing to be assembled by being pushed on. However, the temperature may not become so large that the bearings are damaged or destroyed. Here, particular attention must be paid to any lubricant which may have been introduced. Once the rolling bearing has reached the assembly temperature, the assembly process must take place quickly, since the rolling bearing cools quickly after the removal of the heat source and the inner diameter begins to decrease in size. Should the rolling bearing, as it is assembled on the shaft, have already cooled to such an extent that it can no longer be moved before the final position has been reached, then the bearing usually becomes unusable. Said bearing can often only be removed from the shaft by being damaged or destroyed. In some cases, the shaft also becomes unusable.

The heating of the rolling bearing can, in complex devices, take place by means of regulable heating plates with which the temperature can be preselected within small tolerance ranges. In contrast, if simple heating plates, furnaces or welding torches are used, the risk of destroying the rolling bearing as a result of an excessively high temperature, or the risk of unsuccessful assembly on account of an excessively low temperature, is considerably increased. In all known methods for forming a shrink fit of rolling bearings, it is always necessary to depend on external devices for heating, which is a long-established disadvantage of said type of connection for rolling bearings.

The invention is therefore based on the object of providing a rolling bearing whose rolling bearing ring which is to be shrunk onto a shaft or onto a similar frame element can be heated to an assembly temperature without external devices and which can, if required, be held at said temperature for a certain period of time. One part-object is considered to be that of also ensuring an optimum temperature in start-up phases during later operation, in particular of providing an additional heat supply in the bearing.

SUMMARY OF THE INVENTION

One important aspect of the invention is the integration of an electrical heating element in or on the rolling bearing ring which is to be heated. This involves a lost heating element, since said heating element is available only for heating one rolling bearing. One particular advantage of this invention is that the risk of unsuccessful assembly is drastically reduced, since the heating need not be ended before assembly has been completed. In the known methods, the rolling bearing has to be removed from the external device for heating before being assembled, which brings about the beginning of the cooling process. According to the invention, an electrical heating element on the rolling bearing ring permits heating firstly up to a predefined, easily reproducible temperature, and also a continued supply of heat until the end of assembly if required.

Under certain preconditions, it is also possible by means of the invention for rolling bearings which are in frictional engagement with the shaft to be dismounted again without being damaged. For this purpose, the temperature gradient between the rolling bearing and the frame element must be so large that the rolling bearing can be heated by means of the integrated heating element to such an extent that it expands to a sufficient extent and can be released from the frame element. Said high temperature gradient can be brought about by means of low thermal conductivity between the rolling bearing and the frame element or a high level of heat energy introduced into the rolling bearing. The frame element can also be cooled.

In one preferred embodiment, the heating element is embodied as a thick-film heating resistor. Thick-film heating resistors of said type can be produced in a cost-effective manner, so that the costs for a rolling bearing according to the invention are not increased considerably.

A thick-film heating resistor of said type can also be designed such that it simultaneously has a current-insulating effect or that it, as an additional function, provides current insulation on the rolling bearing or of the rolling bearing. In this case, originally provided current insulation can be substituted by this—in this case—multi-functional layer.

A temperature display means, for example a film thermometer, is preferably arranged on the heated rolling bearing ring. In this way, it is possible to see when the rolling bearing ring has reached the required temperature, so that the assembly can take place without unnecessary waiting time.

In one preferred embodiment, a temperature control unit, in particular a fuse element or a thermostat, is integrated in the heating element, which temperature control unit interacts with the heating element in order to provide temperature control and/or temperature regulation.

The fuse element preferably breaks the electrical circuit if a predefined limit temperature is exceeded. Likewise, the thermostat preferably activates or deactivates the energy supply to the heating element if a predefinable limit temperature is exceeded and/or undershot.

It is thereby ensured that the rolling bearing does not become too hot and is not thereby damaged or destroyed. This can easily happen in known rolling bearings in particular when no complex device is available for heating to a restricted temperature range.

In one particular embodiment, a supply of electrical energy to the rolling bearing is also possible during later operation. It is thereby possible to ensure an optimum temperature of the rolling bearing in the start-up phases too. This is for example necessary if the lubricants used have the required viscosity only once the operating temperature has been reached and/or the required play conditions are generated in the rolling bearing only once the operating temperature has been reached.

In a further embodiment, the heated rolling bearing ring has grooves in which the heating element is arranged. The grooves increase the area for heat conduction between the heating element and rolling bearing ring, such that the heating of the rolling bearing ring can take place more quickly and more efficiently. Furthermore, the heating element can in this way be designed to be larger and more powerful.

In one particular embodiment, the thick-film heating resistor is situated on the running face of the heated rolling bearing ring. It is thereby possible to provide a sufficiently large area for the transfer of heat to the rolling bearing ring even in the case of flat rolling bearing rings. The thick-film heating resistor should then be formed such that, during subsequent operation, it is rubbed off by the movement of the rolling bodies without damage to the bearing.

In addition, a method is specified for achieving the above-mentioned object. The particular advantage of said method is that the rolling bearing can be assembled without cumbersome handling of heating units. One pre-condition is that the coefficient of thermal conduction of the heated rolling bearing ring permits heating of the rolling bearing inner ring up to the assembly temperature. Most rolling bearings are produced from steel, for which this pre-condition is met. In special cases, however, it is also possible for additional heating to a basic temperature to he carried out by means of external heat sources, so that only additional heating is provided by the integrated heating element.

It is advantageous for the method according to the invention to be designed such that the thick-film heating resistor is supplied with electrical energy until the rolling bearing is positioned on the frame element. In this way, the rolling bearing does not cool down early, which can lead to unsuccessful assembly. The method can therefore be carried out without time pressure.

BRIEF DESCRIPTION OF THE DRAWING

The present invention will be further understood and appreciated by reading the following description in conjunction with the accompanying exemplary embodiment of the invention, in which:

The FIGURE shows a side view of a rolling bearing having a thick-film heating resistor on the end side of the inner bearing ring.

DETAILED DESCRIPTION OF THE INVENTION

In the illustrated example, a rolling bearing 01 is embodied as a ball bearing with an otherwise conventional construction composed of an inner bearing ring 02 and an outer bearing ring 03. Balls 04 function as rolling bodies, which balls 04 are guided in a cage 06. The parts of the cage 06 are connected to one another by means of rivets 07. A thick-film heating resistor 08 is printed on the end side of the inner bearing ring 02. Thick-film heating resistors can be largely adapted in terms of their geometric shape to the respective support. It is thereby possible to form the thick-film heating resistor in this embodiment as a circular ring, which represents an optimum shape for the transfer of heat on the end side of the rolling bearing ring 02. The heating required for assembly takes place according to the invention by means of the thick-film heating resistor 08 by virtue of the latter being supplied with current. No external devices such as heating plates or inductive heating devices are required for heating the rolling bearing. It is therefore also possible for bearings of said type to be assembled by manufacturers or end customers who carry out such assembly only rarely and who therefore do not have suitable devices for heating the rolling bearing. Only a suitable power source which feeds the thick-film heating resistor 08 is required. The thick-film heating resistor 08 can be designed such that a conventional power socket of the power supply network or a car battery can serve as a power source.

At its ends, the thick-film heating resistor 08 has electrical contacts 09. For the electrical connection of the thick-film heating resistor 08, lines 11 are connected to the contacts 09. As a result of the thick-film heating resistor being printed directly onto the inner rolling bearing ring 02 which is produced from steel, good heat-conducting contact to the inner rolling bearing ring 02 is provided. If a current flows via the lines through the thick-film heating resistor 08, then firstly the thick-film heating resistor is heated and, as a result, also the inner rolling bearing ring 02. As a result of the heating, the inner rolling bearing ring 02 expands, such that its inner diameter becomes larger. Once the assembly temperature has been reached, assembly can begin. In contrast to the known methods, the assembly can take place without time pressure, since the bearing 01 continues to be heated. The rolling bearing 01 can be carefully assembled onto the intended shaft or onto some other frame element. The only time restriction results from the fact that, if the rolling bearing 01 remains at one position of the shaft for a relatively long time, the shaft is also heated at said position.

In the illustrated example, a thermostat 12 is integrated in the thick-film heating resistor 08. If the temperature of the inner rolling bearing ring 02 exceeds a defined temperature, the electrical circuit to the thick-film heating resistor is broken. It is thereby ensured that the inner rolling bearing ring 02 does not become so hot that the rolling bearing is damaged or destroyed. Instead of a thermostat, it is also possible for a temperature sensor to be integrated in the thick-film heating resistor, which temperature sensor is connected to an integrated or external controller of the power source of the thick-film heating resistor.

REFERENCE SYMBOLS

01 Rolling bearing
02 Inner rolling bearing ring
03 Outer rolling bearing ring
04 Rolling bodies (balls)
05 -
06 Cage
07 Rivets
08 Thick-film heating resistor
09 Electrical contacts
10 -
11 Electrical lines
12 Thermostat

The invention claimed is:

1. A rolling bearing comprising:
   at least one heated rolling bearing ring, and an electrical heating element applied, in good heat-conducting contact, to a surface section of the heated rolling bearing ring, with a heat quantity which can be generated by the heating element being such that the heated rolling bearing ring undergoes thermal expansion during heating, which permits an assembly of the heated rolling bearing onto a frame element with a formation of a shrink fit during the subsequent cooling,
   wherein the heating element is a thick-film heating resistor which is situated on the heated rolling bearing ring, and
   wherein a temperature sensor and/or a thermostat is integrated into the heating element.

2. The rolling bearing as claimed in claim 1, wherein the heating element is applied to end sides of the heated rolling bearing ring.

3. The rolling bearing as claimed in claim 1, wherein the heating element can also be supplied with electrical energy after being assembled on the frame, in order to be able to set a desired bearing temperature.

4. The rolling bearing as claimed in claim 1, wherein a temperature control unit is integrated into the heating element, which temperature control unit interacts with the heating element in order to provide temperature control and/or temperature regulation.

5. The rolling bearing as claimed in claim 4, wherein a fuse element breaks an energy supply to the heating element if a predefined limit temperature is exceeded and/or a thermostat activates or deactivates the energy supply to the heating element if a predefinable limit temperature is exceeded and/or undershot.

* * * * *